United States Patent
Xiang et al.

(10) Patent No.: US 10,609,139 B2
(45) Date of Patent: Mar. 31, 2020

(54) COORDINATOR OWNERSHIP AUTHENTICATION IN A DISTRIBUTED SYSTEM WITH MULTIPLE STORAGE OBJECT COORDINATORS

(71) Applicant: VMware, Inc., Palo Alto, CA (US)

(72) Inventors: Enning Xiang, San Jose, CA (US); Pascal Renauld, Palo Alto, CA (US); Eric Knauft, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 294 days.

(21) Appl. No.: 15/674,375

(22) Filed: Aug. 10, 2017

(65) Prior Publication Data

US 2019/0052708 A1    Feb. 14, 2019

(51) Int. Cl.
| | | |
|---|---|---|
| H04L 29/08 | (2006.01) |
| H04L 12/24 | (2006.01) |
| G06F 13/10 | (2006.01) |
| G06F 9/451 | (2018.01) |
| G06F 16/27 | (2019.01) |
| G06F 16/182 | (2019.01) |
| H04L 29/14 | (2006.01) |
| G06F 11/07 | (2006.01) |
| G06F 9/455 | (2018.01) |

(52) U.S. Cl.
CPC .......... *H04L 67/1095* (2013.01); *G06F 9/452* (2018.02); *G06F 11/07* (2013.01); *G06F 13/102* (2013.01); *G06F 16/184* (2019.01); *G06F 16/27* (2019.01); *H04L 41/20* (2013.01); *H04L 67/1097* (2013.01); *H04L 69/40* (2013.01); *G06F 9/45558* (2013.01); *G06F 2009/45579* (2013.01); *H04L 41/5025* (2013.01)

(58) Field of Classification Search
CPC . H04L 67/1095; H04L 41/20; H04L 41/5025; H04L 67/1097; H04L 69/40; G06F 9/452; G06F 16/27; G06F 16/184; G06F 11/07; G06F 13/102; G06F 9/45558
See application file for complete search history.

(56) References Cited

U.S. PATENT DOCUMENTS

| | | | | |
|---|---|---|---|---|
| 9,020,891 B1 * | 4/2015 | Stefani | ............... | G06F 16/2343 707/636 |
| 2009/0063487 A1 * | 3/2009 | Bish | ....................... | G06F 16/10 |
| 2009/0271412 A1 * | 10/2009 | Lacapra | ............... | H04L 67/104 |

* cited by examiner

*Primary Examiner* — Viet D Vu
(74) *Attorney, Agent, or Firm* — Fish & Richardson P.C.

(57) ABSTRACT

Exemplary methods, apparatuses, and systems include a replica node storing a component of a storage object detecting that a primary coordinator for the storage object component is no longer available to serve as primary coordinator. The replica node is within a cluster of nodes storing components of the storage object. In response to detecting that the primary coordinator is no longer available, the replica node updates a first metadata entry indicating that a secondary coordinator for the storage object component is unhealthy. The replica node rejects connection requests from the secondary coordinator in response to the first metadata entry indicating that the secondary coordinator for the storage object component is unhealthy.

20 Claims, 3 Drawing Sheets

COORDINATOR OWNERSHIP AUTHENTICATION IN A DISTRIBUTED SYSTEM WITH MULTIPLE STORAGE OBJECT COORDINATORS

FIELD OF THE INVENTION

The various embodiments described in this document relate to the management of storage object coordinators in a storage system distributed across multiple local area network sites.

BACKGROUND OF THE INVENTION

In a complex computing environment, an administrator can organize computing, memory, and storage resources into levels of aggregation. For example, a node represents the aggregate computing, memory, and storage resources of a physical server. A cluster of nodes represents the aggregate computing, memory, and storage resources of a group of physical servers. An administrator can manage the aggregate resources of the cluster as a single entity. For example, a cluster of nodes organized as a distributed storage system can store a storage object as components of the object, and replicas of components, on multiple storage devices within the cluster. Maintaining the distributed storage system across multiple local area network sites substantially increases fault tolerance and provides better support for site disaster recovery.

Deploying multiple object owners or coordinators in the distributed storage system across the multiple network sites improves performance in managing the object. For example, each object has a primary coordinator that takes ownership of the object and is in charge of processing all input/output (I/O) requests directed to the object. The primary coordinator routes or distributes the I/O to the appropriate object replicas. When the replicas are distributed across multiple network sites, each site may have a secondary coordinator to manage the replicas of the object inside that network site. The primary coordinator forwards the I/O to the secondary coordinators, which each will then route or distribute the I/O to replicas of the object inside the network site managed by that secondary coordinator.

Such a configuration, however, creates difficulty in authenticating different coordinators that each might have an exclusive authorization for connection to a component replica at different times. For example, because a new primary coordinator can be elected dynamically once the previous primary coordinator is shut down, a race condition is probable when both the new primary coordinator and old secondary coordinator attempt to connect to a replica. This may result in both coordinators attempting to reestablish connection to the replica(s) after the other coordinator interrupts the previously-established connection.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

This document describes embodiments that manage storage object coordinators for a storage system distributed across multiple local area network sites. Embodiments synchronize metadata (e.g., key/value pairs) indicating primary and secondary coordinator ownership for managing I/O requests for storage object components. For example, a node elected to serve as the primary coordinator selects a secondary coordinator and publishes metadata indicating the primary and secondary coordinators for the corresponding storage object component(s) to the cluster of nodes. A node storing a storage object component authenticates a coordinator connection request using the metadata. Additionally, when the metadata includes a secondary coordinator, the secondary coordinator has a higher priority than the primary coordinator in connecting to the corresponding node storing the storage object component(s). If the primary coordinator is disconnected from the cluster of nodes or otherwise unavailable, each of one or more nodes in the cluster updates the metadata entries to indicate that both the primary and secondary coordinators for the storage object component are unhealthy. If a node storing the storage object component receives a subsequent connection request from the secondary coordinator, the node rejects the connection request in response to the metadata entry indicating that the secondary coordinator for the storage object component is unhealthy. The node will continue to reject connection requests until a new primary coordinator is elected and publishes updated metadata to the cluster. As a result, nodes will not face the potential split-brain problem of a prior coordinator and a new coordinator both attempting to connect to the same node(s) and interrupting one another's connections.

Figure 1:
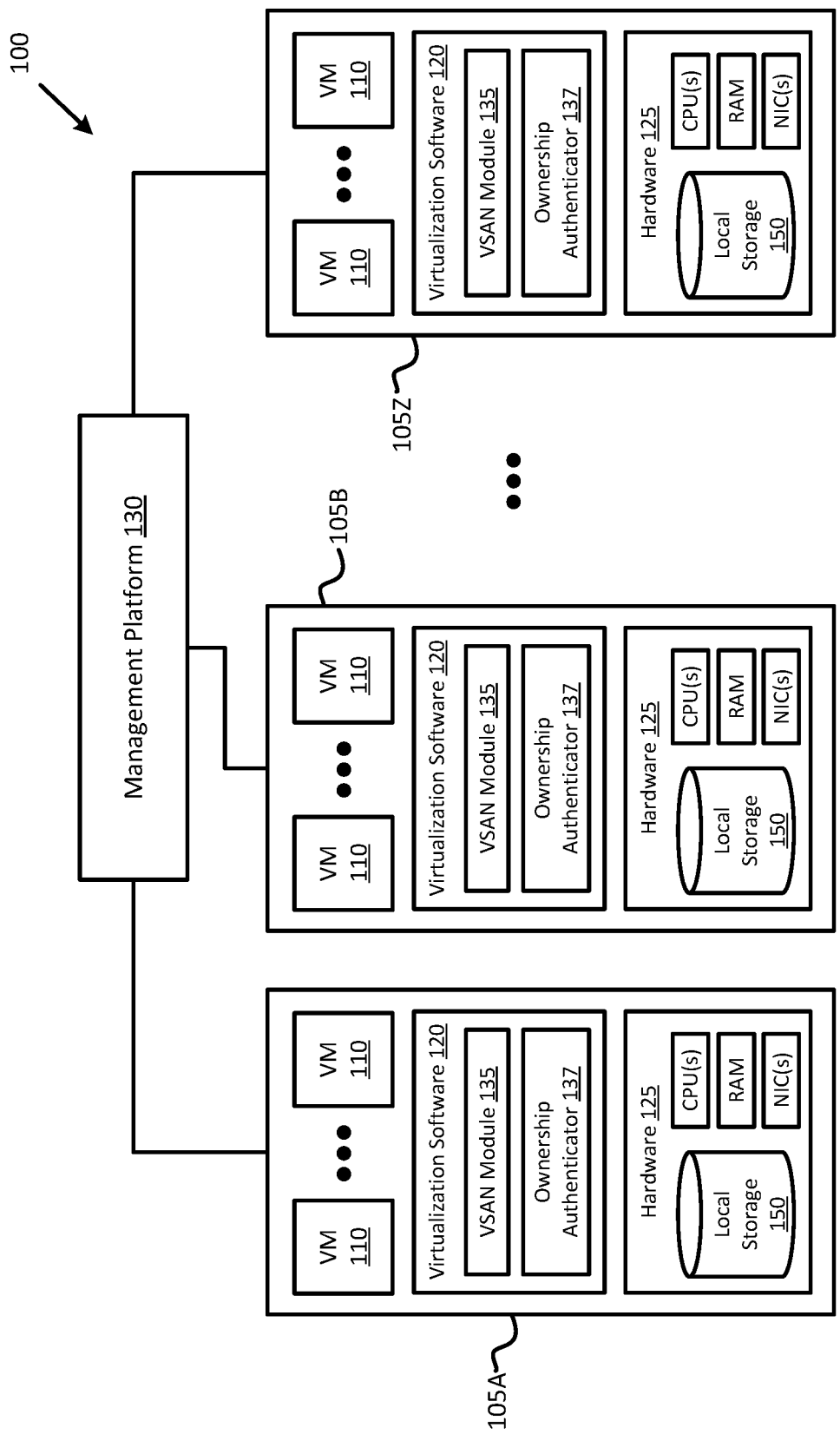
FIG. 1 illustrates, in block diagram form, an exemplary complex computing environment including one or more networked processing devices configured to manage storage object coordinators for a storage system distributed across multiple local area network sites.

FIG. 1 illustrates, in block diagram form, exemplary computing environment 100, including one or more networked nodes 105 configured to manage storage object coordinators for a storage system distributed across multiple local area network sites. Nodes 105 may also be referred to within this document as processing devices, computers, and/or servers. While illustrated as nodes 105A-Z, computing environment may include fewer or more nodes 105 than depicted in FIG. 1.

In one embodiment, server-based computing in computing environment 100 provides centrally-managed user virtual desktops, such as those implemented by virtual machines (VMs) 110, via one or more networks (e.g., a local area network or other private or publicly accessible wide area network, such as the Internet). In one embodiment, one or more VMs 110 implement a virtualized compute, networking, storage, or security service (e.g., a firewall, webserver, database server, etc.).

Hardware 125 includes one or more processors ("CPU(s)"), local storage 150 and memory (e.g., "RAM"), and network interface controllers ("NIC(s)"). Local storage 150 and memory may be used for storing data, metadata, and programs for execution by the processor(s). The data storage and memory may include one or more of volatile and non-volatile memories, such as Random Access Memory ("RAM"), Read Only Memory ("ROM"), a solid-state drive ("SSD"), Flash, Phase Change Memory ("PCM"), or other types of data storage, such as magnetic storage devices, optical storage devices, etc. The memory may be internal or distributed memory. Local storage 150 is housed in or otherwise directly attached to the nodes 105 and may include combinations of solid-state drives (SSDs) and/or magnetic or spinning disks (MDs). As used in this document, the term "housed" or "housed in" may be used to encompass both housed in or otherwise directly attached storage. In some embodiments, SSDs serve as a read cache and/or write buffer in front of magnetic disks to increase I/O performance.

One or more buses may be used to interconnect the various components of hardware 125. Additionally, the network interface controllers may be used to connect nodes 105, via a wired or wireless network, with one another.

Virtualization software 120 runs on hardware 125 of host server or node (e.g., a physical computer) 105. Virtualization software 120 manages VMs 110 and physical resources, such as hardware 125. Additionally, virtualization software 120 maintains virtual-to-physical hardware mappings. For example, virtualization software 120 may manage VM access to a processor, memory, or a network interface within hardware 125. Additionally, virtualization software 120 may manage access to virtual disks (or portions thereof) and other related files within local storage 150 that may be accessed by VMs 110 residing in one or more nodes 105.

Management platform 130 enables an administrator to manage the configuration of computing environment 100. In one embodiment, management platform 130 provides a management console for manual and automated control of nodes 105, VMs 110, and hardware 125. For example, management platform 130 may provision, configure, and maintain VMs 110 as virtual desktops or network services, manage pools of computer resources to run VMs 110, etc. In one embodiment, an administrator sets and/or defines storage policies using management platform 130. In one embodiment, management platform 130 includes CPU(s), RAM, and NIC(s) similar to hardware 125 described with reference to nodes 105. In an alternate embodiment, management platform 130 runs within a node, e.g., within a VM 110.

Each node 105 includes storage management or VSAN module 135 to automate storage management workflows and provide access to storage objects. Each VSAN module 135 (e.g., through an object management layer or submodule) communicates with other VSAN modules 135 of other nodes 105 to create and maintain an in-memory metadata database (e.g., maintained separately but in synchronized fashion in the memory of each node 105) that contains metadata describing the locations, configurations, policies, and relationships among the various objects stored in an object store and nodes 105 included in the cluster. This in-memory metadata database is utilized by a VSAN module 135, for example, when an administrator first creates a virtual disk for a VM 110 as well as when the VM 110 is running and performing I/O operations (e.g., read or write) on the virtual disk. VSAN module 135 traverses a hierarchy of objects using the metadata in the in-memory database in order to properly route an I/O operation request to the node (or nodes) 105 that houses (house) the actual physical local storage that backs the portion of the virtual disk that is subject to the I/O operation.

Each node 105 includes ownership authenticator 137. Each ownership authenticator 137 creates and maintains a metadata database (e.g., maintained separately by each node 105 but in a synchronized fashion) that contains metadata describing the ownership of storage object components. For example, a cluster of nodes 105 may utilize a distributed key/value system to represent the ownership of storage object components within a distributed storage system. For example, a master node publishes, broadcasts, or otherwise synchronizes the key/value metadata by transmitting updates to the metadata when a node joins the cluster, when a node leaves the cluster, when a node is elected to serve as primary coordinator for a storage object component, when a node is selected to serve as a secondary coordinator for a storage object component, etc. Additionally, ownership authenticator 137 maintains the health of designated coordinators and authenticates (accepts/rejects) connection requests to storage object components as described with reference to FIG. 2.

In one embodiment, a master ownership authenticator 137 within one of nodes 105 manages synchronization of metadata between secondary ownership authenticators 137 in each of the other nodes 105. In another embodiment, master ownership authenticator 137 is implemented within management platform 130. Each ownership authenticator 137 stores a local copy of key/value metadata within local storage 150. For example, the key/value metadata may be descriptive of data stored within storage 150 within the cluster of nodes or another aggregated resource. In one embodiment, the key/value metadata includes identification of one node 105 as primary coordinator, identification of another node 105 as a secondary coordinator, and a list of storage object components associated with the primary and secondary coordinators. The master ownership authenticator 137 creates or receives updates to the key/vale metadata and broadcasts the updates to the cluster. Each secondary ownership authenticator 137 commits the updates to its local copy of the key/value metadata. In another embodiment, a primary coordinator node 105 broadcasts an update to key/value metadata to the cluster directly rather than relying on the master ownership authenticator 137 to provide the metadata update. The synchronization of metadata by ownership authenticator 137 is described further with reference to FIG. 2.

Figure 2:
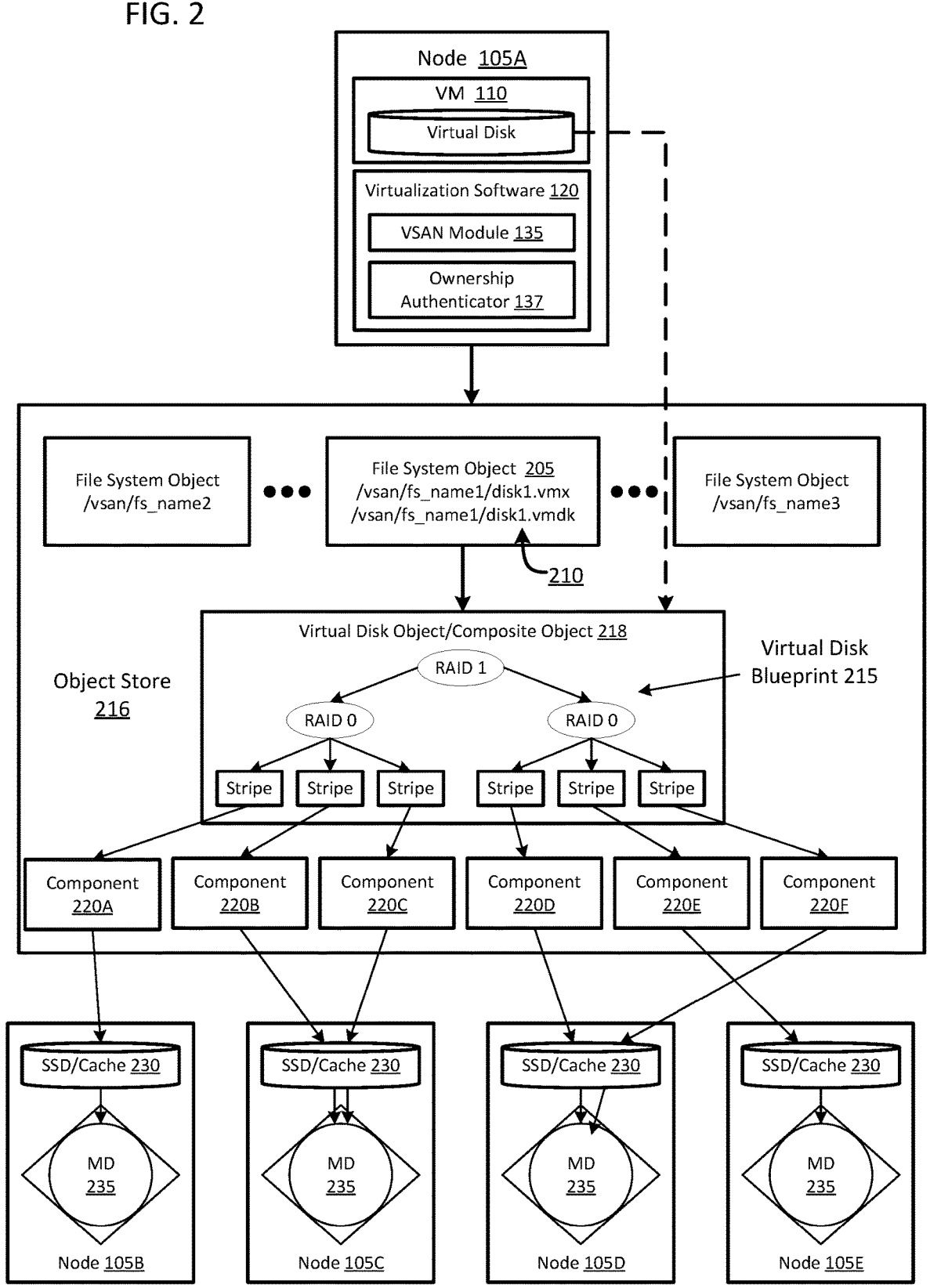
FIG. 2 illustrates additional detail of the networked processing devices configured to manage storage object coordinators, including an example hierarchical structure of objects subject to coordinator ownership.

FIG. 2 illustrates additional detail of nodes 105 configured to manage storage object coordinators, including an example hierarchical structure of storage objects subject to coordinator ownership. A VM 110 running on one of nodes 105 may perform I/O operations on a virtual disk or other data stored as a hierarchical or composite object 218 in object store 216. Virtualization software 120 provides VM 110 access to the virtual disk by interfacing with VSAN module 135 (e.g., by auto-mounting the top-level file system object corresponding to the virtual disk object). For example, VSAN module 135, by querying its local copy of the in-memory metadata database, identifies file system object 205 (e.g., a VMFS file system object) that stores descriptor file 210 for the virtual disk. File system object 205 may store a variety of other files, including but not limited to virtual machine configuration files and the like.

Descriptor file 210 includes a reference to composite object 218 stored in object store 216 and which represents the virtual disk (and thus this document may also reference composite object 218 as a virtual disk object). Composite object 218 also stores metadata describing storage organization 215 or configuration for the virtual disk (also referred to as a virtual disk "blueprint") that suits the storage requirements or service level agreements (SLAs) in a corresponding storage profile or policy (e.g., capacity, availability, IOPs, etc.) generated by an administrator when creating the virtual disk. For example, as illustrated in FIG. 2, composite object 218 includes a virtual disk blueprint 215 that describes a RAID 1 configuration where two mirrored copies of the virtual disk (e.g., mirrors) are each further striped in a RAID 0 configuration. Composite object 218 may thus contain references to a number of "leaves" or components 220A-220F corresponding to each stripe (e.g., data partition of the virtual disk) in each of the virtual disk mirrors. The metadata accessible by VSAN module 135 in the in-memory metadata database for each component 220 (e.g., for each stripe) provides a mapping to or otherwise identifies a particular node 105 in the cluster that houses the physical storage resources (e.g., SSDs 230, magnetic disks 235) that actually store the stripe (as well as the location of the stripe within such physical resource). A primary or secondary coordinator uses this information to determine to which nodes 105 to connect to distribute I/O requests.

In one embodiment, composite object 218 is mirrored and striped (e.g., using RAID 1 and RAID 0, respectively) to nodes 105 within distinct local area networks. For example, components 220A-220C represent one copy of composite object 218 in a first local area network of the cluster. Node 105B and node 105C are a part of the first local area network and provide local storage 150 (in the form of SSDs 230 and/or magnetic disks 235) to store components 220A-220C. Components 220D-F represent a replica/another copy of composite object 218 in a second local area network of the cluster. Node 105D and node 105E are a part of the second local area network and provide local storage 150 (in the form of SSDs 230 and/or magnetic disks 235) to store components 220D-220F. In such an embodiment, VSAN module 135 of node 105A may serve as the primary coordinator for components 220. Additionally, VSAN module 135 of another node (e.g., node 105D or node 105E) may serve as secondary coordinator for components 220D-F. In one embodiment, the secondary coordinator maintains a full or partial copy virtual disk blueprint 215 representing at least the portion of the RAID tree stored within the secondary network site.

Figure 3:
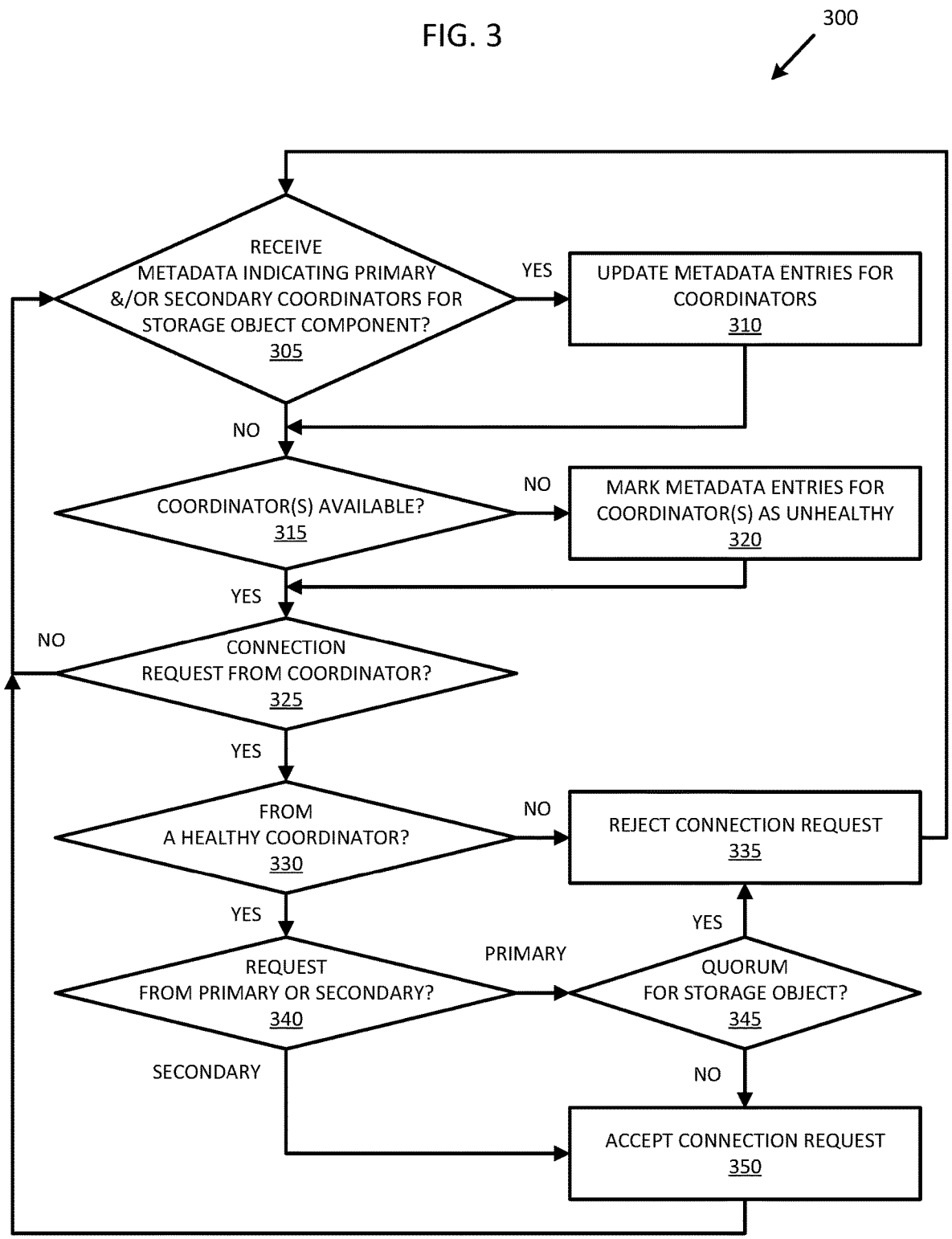
FIG. 3 is a flow chart illustrating an exemplary method of managing storage object coordinators for a storage system distributed across multiple local area network sites.

FIG. 3 is a flow chart illustrating exemplary method 300 of managing storage object coordinators for a storage system distributed across multiple local area network sites. In particular, method 300 describes managing primary and secondary storage object coordinators for a secondary local area network of nodes 105 within a cluster that includes nodes 105 in two or more local area networks. For example, each storage object has a primary coordinator that takes ownership of the object and processes input/output (I/O) requests directed to the object. The primary coordinator routes, directly or indirectly, the I/O to the appropriate object components and replicas of those components. When nodes 105 within a secondary site store object components (e.g., replicas), the secondary network site may have a secondary coordinator to manage the object components in that site. The primary coordinator forwards I/O requests to the secondary coordinator. The secondary coordinator connects to the nodes 105 within the secondary network site to route or distribute the I/O to the object components.

At block 305, ownership authenticator 137 of a node storing a replica of a storage object component ("replica node") determines whether it has received metadata indicating a new primary coordinator node 105 and/or a new secondary coordinator node 105 for one or more components 220. For example, another node 105 may broadcast or multicast to the cluster one or more new coordinators and the corresponding object components owned by the coordinators. In one embodiment, a master VSAN module 135 or ownership authenticator 137 within the cluster tracks the state of nodes 105 within the cluster and transmits the metadata to the nodes 105 in response to changes in state (e.g., node(s) 105 becoming unavailable, an election of a new primary coordinator, a selection of a new secondary coordinator by the primary coordinator for a secondary network site, etc.). In another embodiment, a newly elected primary coordinator broadcasts the metadata update. For example, the master or primary coordinator node 105 may register for callbacks on one or more entry types in a metadata database or similar data structure and transmit metadata in response to changes to the metadata database.

If ownership authenticator 137 of replica node 105 detects that it has received coordinator metadata, at block 310, ownership authenticator 137 updates a local copy of metadata entry/entries for the coordinator(s). For example, each ownership authenticator 137 maintains a local key/value data structure in memory or storage 150 that maps an identifier for the primary coordinator and the identifier for the secondary coordinator to a list of one or more components 220 owned/managed by those coordinators. Additionally, the primary and secondary coordinators also map to a flag or other indication of health. If ownership authenticator 137 is updating an existing entry that ownership authenticator 137 previously marked as unhealthy, ownership authenticator 137 marks the new coordinator(s) as healthy. For example, ownership authenticator 137 may receive metadata for a newly elected primary coordinator and a new secondary coordinator selected by the new primary coordinator from master ownership authenticator 137. Ownership authenticator 137 updates metadata entries for the corresponding components 220 and, if needed, marks the primary and secondary coordinators as healthy.

If ownership authenticator 137 of replica node 105 does not detect that it has received coordinator metadata or in addition to updating the metadata entries, at block 315, ownership authenticator 137 determines the availability state of one or both of the primary and secondary coordinators. For example, ownership authenticator 137 may receive indication from a master ownership authenticator or otherwise detect that one or more coordinators have become unavailable due to a network partition, powering off, etc. In one embodiment, ownership authenticator 137 monitors a reliable data transfer (RDT) association between replica node 105 and primary and secondary coordinator nodes 105 to detect connected and disconnected states. In one embodiment, ownership authenticator 137 determines that replica node 105 is disconnected from a coordinator when the network connection between replica node 105 and coordinator node 105 has been transient or failing for a threshold period of time.

If ownership authenticator 137 detects that a coordinator is unavailable, at block 320, ownership authenticator 137 updates the metadata entry for the coordinator to indicate that the coordinator is unhealthy. For example, if ownership authenticator 137 detects that the secondary coordinator is unavailable, ownership authenticator 137 marks the entry for the secondary coordinator as unhealthy until the primary coordinator selects a new secondary coordinator or otherwise updates the secondary coordinator metadata. In one embodiment, ownership authenticator 137 marks both the primary and secondary coordinators as unhealthy in response to detecting that the primary coordinator is unavailable (e.g., even if the secondary coordinator is still available). If ownership authenticator 137 detected that replica node 105 is disconnected from a coordinator node 105 (and hasn't received indication from another node 105), ownership authenticator 137 transmits an indication of the unavailability of the coordinator to a master ownership authenticator 137 or the cluster of nodes 105.

In one embodiment, replica node 105 detects that it is disconnected from one or more coordinators in response to replica node 105 leaving the cluster. In such an embodiment, ownership authenticator 137 of replica node 105 marks all entries not published by replica node 105 as unhealthy.

If ownership authenticator 137 detects that the coordinators are available or in addition to marking one or both coordinators unhealthy, at block 325, ownership authenticator 137 determines if it has received a connection request from a coordinator. If ownership authenticator 137 does not detect a connection request, method 300 continues at block 305 to monitor for metadata updates and coordinator health status.

If ownership authenticator 137 detects a connection request, at block 330, ownership authenticator 137 attempts to authenticate the request by looking up the identifier in the local metadata data structure and checking the coordinator's health status. If the coordinator attempting to connect to replica node 105 is unhealthy, at block 335, ownership authenticator 137 rejects the connection request. For example, if ownership authenticator 137 detected that a primary coordinator became unavailable and, in response, marked the secondary coordinator as unhealthy, ownership authenticator 137 will reject subsequent attempts by the secondary coordinator to connect to replica node 105. In addition to rejecting the connection request, method 300 continues at block 305 to monitor for metadata updates and coordinator health status and to process connection requests.

If the coordinator attempting to connect to replica node 105 is healthy, at block 340, ownership authenticator 137 determines if the request is from the primary coordinator or the secondary coordinator. In one embodiment, ownership authenticator 137 prioritizes connection requests from the secondary coordinator over connection requests from the primary coordinator. For example, ownership authenticator 137 prioritizes connection requests from the secondary coordinator over connection requests from the primary coordinator when there is quorum for the storage object but accepts connection requests from the primary coordinator when there is no quorum.

If the connection request is from the primary coordinator, at block 345, ownership authenticator 137 determines if there is quorum for the storage object. If there is quorum, at block 335, ownership authenticator 137 blocks the connection request from the primary coordinator. In one embodiment, ownership authenticator 137 determines if there is a healthy secondary coordinator. For example, in addition to or as an alternative to determining if there is quorum for the storage object, ownership authenticator 137 determines if a primary coordinator is attempting to connect to replica node 105 despite there being a healthy secondary coordinator. If the secondary coordinator is healthy, ownership authenticator 137 blocks the connection request from the primary coordinator.

If there is no quorum for the storage object, at block 350, ownership authenticator 137 accepts the connection request from the primary coordinator. In one embodiment, ownership authenticator 137 of replica node 105 marks the secondary coordinator metadata entry as unhealthy in response to determining that there is no quorum for the storage object and optionally transmits an indication of lack of quorum or unhealthy status of the secondary coordinator to master ownership authenticator 137 or other nodes 105 within the cluster. Additionally, if the connection request is from a healthy secondary coordinator, ownership authenticator 137 accepts the connection request at block 350. Method 300 continues at block 305 to monitor for metadata updates and coordinator health status and to process connection requests.

It will be apparent from this description that aspects of the inventions may be embodied, at least in part, in software. That is, a computer system or other data processing system, such as nodes 105, may carry out the computer-implemented method 300 in response to its processor executing sequences of instructions contained in a memory or other non-transitory machine-readable storage medium. The software may further be transmitted or received over a network (not shown) via a network interface. In various embodiments, hardwired circuitry may be used in combination with the software instructions to implement the present embodiments. It will also be appreciated that additional components, not shown, may also be part of nodes 105, and, in some embodiments, fewer components than that shown in FIG. 1 may also be used in nodes 105.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses distinct name spaces to isolate the containers from each other and therefore provides operating-system level segregation of the different groups of applications that operate within different containers. This segregation is akin to the VM segregation that is offered in hypervisor-virtualized environments, and thus can be viewed as a form of virtualization that isolates different groups of applications that operate in different containers. Such containers are more lightweight than VMs.

It should be recognized that while the specification refers to VMs, the examples given could be any type of DCNs, including physical hosts, VMs, non-VM containers, and hypervisor kernel network interface modules. In fact, the example networks could include combinations of different types of DCNs in some embodiments.

In the foregoing specification, the invention has been described with reference to specific exemplary embodiments thereof. Various embodiments and aspects of the invention(s) are described with reference to details discussed in this document, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Additionally, as used in this document, the term "exemplary" refers to embodiments that serve as simply an example or illustration. The use of exemplary should not be construed as an indication of preferred examples. Blocks with dashed borders (e.g., large dashes, small dashes, dot-dash, dots) are used to illustrate optional operations that add additional features to embodiments of the invention. However, such notation should not be taken to mean that these are the only options or optional operations, and/or that blocks with solid borders are not optional in some embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described in this document may be performed with fewer or more features/blocks or the features/blocks may be performed in differing orders. Additionally, the methods described in this document may be repeated or performed in parallel with one another or in parallel with different instances of the same or similar methods.

What is claimed is:

1. A computer-implemented method, comprising:
    detecting, by a replica node storing a component of a storage object, that a primary coordinator for the storage object component is no longer available to serve as primary coordinator, wherein the replica node is within a cluster of nodes storing components of the storage object;
    in response to detecting that the primary coordinator is no longer available, updating, at the replica node, a first metadata entry indicating that a secondary coordinator for the storage object component is unhealthy;
    receiving, by the replica node, a connection request from the secondary coordinator to access the storage object component; and
    rejecting the connection request from the secondary coordinator in response to the first metadata entry indicating that the secondary coordinator for the storage object component is unhealthy.

2. The computer-implemented method of claim 1, further comprising:
    in response to detecting that the primary coordinator is no longer available, updating a second metadata entry indicating that the primary coordinator for the storage object component is unhealthy.

3. The computer-implemented method of claim 1, wherein the cluster of nodes is distributed across two distinct local area network sites, the primary coordinator processed input/output (I/O) requests for the storage object component in a first of the local area network sites and the secondary coordinator processed the I/O requests forwarded by the primary coordinator for replicas of the storage object component in a second of the local area network sites.

4. The computer-implemented method of claim 1, further comprising:
    receiving metadata indicating an election of a new primary coordinator for the storage object component and a selection of a new secondary coordinator for the storage object component; and
    updating the first metadata entry to indicate that the new secondary coordinator for the storage object component is healthy.

5. The computer-implemented method of claim 4, wherein the new secondary coordinator has a higher priority to connect to the storage object component than the new primary coordinator.

6. The computer-implemented method of claim 1, further comprising:
    receiving metadata indicating an election of a new primary coordinator for the storage object component;
    detecting a lack of quorum for the storage object component within a local area network site for the replica node; and
    granting the new primary coordinator a connection to the storage object component in response to detecting the lack of quorum, wherein the secondary coordinator had a higher priority to connect to the storage object component than the primary coordinator when there was quorum for the storage object component within the local area network.

7. The computer-implemented method of claim 1, wherein a new primary coordinator publishes metadata indicating an election of the new primary coordinator and selection of a secondary coordinator to the cluster of nodes.

8. A non-transitory computer-readable medium storing instructions, which when executed by a processing device, cause the processing device to perform a method comprising:
    computer-implemented method, comprising:
        detecting, by a replica node storing a component of a storage object, that a primary coordinator for the storage object component is no longer available to serve as primary coordinator, wherein the replica node is within a cluster of nodes storing components of the storage object;
        in response to detecting that the primary coordinator is no longer available, updating, at the replica node, a first metadata entry indicating that a secondary coordinator for the storage object component is unhealthy;
        receiving, by the replica node, a connection request from the secondary coordinator to access the storage object component; and
        rejecting the connection request from the secondary coordinator in response to the first metadata entry indicating that the secondary coordinator for the storage object component is unhealthy.

9. The non-transitory computer-readable medium of claim 8, the method further comprising:
in response to detecting that the primary coordinator is no longer available, updating a second metadata entry indicating that the primary coordinator for the storage object component is unhealthy.

10. The non-transitory computer-readable medium of claim 8, wherein the cluster of nodes is distributed across two distinct local area network sites, the primary coordinator processed input/output (I/O) requests for the storage object component in a first of the local area network sites and the secondary coordinator processed the I/O requests forwarded by the primary coordinator for replicas of the storage object component in a second of the local area network sites.

11. The non-transitory computer-readable medium of claim 8, the method further comprising:
receiving metadata indicating an election of a new primary coordinator for the storage object component and a selection of a new secondary coordinator for the storage object component; and
updating the first metadata entry to indicate that the new secondary coordinator for the storage object component is healthy.

12. The non-transitory computer-readable medium of claim 11, wherein the new secondary coordinator has a higher priority to connect to the storage object component than the new primary coordinator.

13. The non-transitory computer-readable medium of claim 8, the method further comprising:
receiving metadata indicating an election of a new primary coordinator for the storage object component;
detecting a lack of quorum for the storage object component within a local area network site for the replica node; and
granting the new primary coordinator a connection to the storage object component in response to detecting the lack of quorum, wherein the secondary coordinator had a higher priority to connect to the storage object component than the primary coordinator when there was quorum for the storage object component within the local area network.

14. The non-transitory computer-readable medium of claim 8, wherein a new primary coordinator publishes metadata indicating an election of the new primary coordinator and selection of a new secondary coordinator to the cluster of nodes.

15. A replica node storing a component of a storage object, the replica node comprising:
a processing device; and
a memory coupled to the processing device, the memory storing instructions which, when executed by the processing device, cause the replica node to:
detect that a primary coordinator for the storage object component is no longer available to serve as primary coordinator, wherein the replica node is within a cluster of nodes storing components of the storage object;
in response to detecting that the primary coordinator is no longer available, update a first metadata entry indicating that a secondary coordinator for the storage object component is unhealthy;
receive a connection request from the secondary coordinator to access the storage object component; and
reject the connection request from the secondary coordinator in response to the first metadata entry indicating that the secondary coordinator for the storage object component is unhealthy.

16. The replica node of claim 15, wherein the instructions further cause the replica node to:
in response to detecting that the primary coordinator is no longer available, update a second metadata entry indicating that the primary coordinator for the storage object component is unhealthy.

17. The replica node of claim 15, wherein the cluster of nodes is distributed across two distinct local area network sites, the primary coordinator processed input/output (I/O) requests for the storage object component in a first of the local area network sites and the secondary coordinator processed the I/O requests forwarded by the primary coordinator for replicas of the storage object component in a second of the local area network sites.

18. The replica node of claim 15, wherein the instructions further cause the replica node to:
receiving metadata indicating an election of a new primary coordinator for the storage object component and a selection of a new secondary coordinator for the storage object component; and
updating the first metadata entry to indicate that the new secondary coordinator for the storage object component is healthy.

19. The replica node of claim 18, wherein the new secondary coordinator has a higher priority to connect to the storage object component than the new primary coordinator.

20. The replica node of claim 15, wherein the instructions further cause the replica node to:
receive metadata indicating an election of a new primary coordinator for the storage object component;
detect a lack of quorum for the storage object component within a local area network site for the replica node; and
grant the new primary coordinator a connection to the storage object component in response to detecting the lack of quorum, wherein the secondary coordinator had a higher priority to connect to the storage object component than the primary coordinator when there was quorum for the storage object component within the local area network.

* * * * *